(12) United States Patent
Farhan et al.

(10) Patent No.: US 6,498,663 B1
(45) Date of Patent: Dec. 24, 2002

(54) METHODS AND SYSTEMS FOR DETECTING OPTICAL LINK PERFORMANCE OF AN OPTICAL LINK IN A HYBRID FIBER COAXIAL PATH

(75) Inventors: Forrest M. Farhan, Duluth, GA (US); Michael J. Labiche, Cumming, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/406,281

(22) Filed: Sep. 24, 1999

(51) Int. Cl.[7] ................................................ H04B 10/08
(52) U.S. Cl. ..................... 359/110; 359/158; 359/135; 370/503; 370/509; 370/514
(58) Field of Search ................................ 359/110, 158, 359/180, 125, 154, 135; 370/503, 509, 514

(56) References Cited

U.S. PATENT DOCUMENTS

| | | | |
|---|---|---|---|
| 4,486,739 A | | 12/1984 | Franaszek et al. |
| 5,517,232 A | | 5/1996 | Heidemann et al. |
| 5,654,816 A | * | 8/1997 | Fishman ..................... 359/177 |
| 5,867,231 A | | 2/1999 | Wada et al. |
| 5,898,512 A | * | 4/1999 | Arai ............................ 359/110 |
| 5,905,585 A | * | 5/1999 | Shirai ......................... 359/110 |
| 6,215,565 B1 | * | 4/2001 | Davis et al. ................. 359/110 |
| 6,285,475 B1 | * | 9/2001 | Fee .............................. 359/110 |
| 6,356,374 B1 | * | 3/2002 | Farhan ........................ 359/180 |
| 6,373,611 B1 | * | 4/2002 | Farhan et al. ............... 359/180 |

FOREIGN PATENT DOCUMENTS

| | | | |
|---|---|---|---|
| EP | 0 334 192 | 9/1989 | |
| EP | 334192 A | * 9/1989 | ................ 359/110 |
| JP | 63136736 | 6/1988 | |
| JP | 03153143 | 7/1991 | |
| JP | 09074403 | 3/1997 | |

OTHER PUBLICATIONS

Bellcore, "Synchronous Optical Network (SONET) Transport Systems: Common Generic Criteria," Technical Reference TR-NWT-000253, Issue 2, Dec. 1991.

* cited by examiner

Primary Examiner—Leslie Pascal
Assistant Examiner—Hanh Phan
(74) Attorney, Agent, or Firm—Robert J. Barnhardt, III; Kenneth M. Massaroni; Shelley L. Couturier (57) ABSTRACT

A broadband network, such as a cable television system, includes a synchronous code generator that converts an analog signal into a digital signal and inserts a synchronous code in the digital signal. The synchronous code generator is in communication with an optical link, which transmits the digital signal. An optical performance monitor receives the digital signal from the optical link and determines performance of the optical link based on errors in the synchronous code. The optical link performance monitor includes an error detector, which detects errors in the synchronous code, and, in response thereto, signals a counter of the error. The counter accumulates the errors detected by the error detector for a period of time. A processor, which is in communication with the counter, determines the optical performance of the optical link based upon the number of errors accumulated by the counter. A user interface displays the results of the processor.

16 Claims, 5 Drawing Sheets

METHODS AND SYSTEMS FOR DETECTING OPTICAL LINK PERFORMANCE OF AN OPTICAL LINK IN A HYBRID FIBER COAXIAL PATH

TECHNICAL FIELD

The present invention generally relates to communications systems, and more specifically, to methods and systems for detecting optical link performance in a hybrid fiber coax path.

BACKGROUND OF THE INVENTION

Fiber optic and coaxial cables are utilized to transmit signals along communications systems, such as a cable television systems. Cable television systems typically include a headend section for receiving satellite signals and converting the signals to a format appropriate for distribution over fiber optic and coaxial cables. The signals can then be converted to an optical signal for transmission from the headend section over fiber optic cable. Optical transmitters can be distributed throughout the cable system for splitting and transmitting optical signals, and optical receivers can be provided for receiving and converting the optical signals to electrical signals that can be further transmitted along branches of the system over coaxial cable rather than fiber optic cable.

The fiber optic and coaxial path in communications systems, referred to herein as a hybrid fiber/coax (HFC) path, has conventionally been employed in a forward manner to transmit high frequency (e.g., 50–750 MHz) cable television signals to subscribers. More recently, however, the HFC path has been used to carry information in a reverse manner, from a subscriber to a cable provider. The reverse HFC path typically operates at lower frequencies (e.g., 5–40 MHz) than those at which the forward path operates. The reverse path communication allows subscriber-generated signals, such as data, video, or audio signals, to be processed by the cable provider, enabling interactive services such as pay-per-view or video-on-demand programming.

Important in many communications systems, including cable television systems, is the need to provide reliable service with little interference. To this effect, an indication of signal quality is generally desirable. A cable service provider's ability to effectively monitor the system's signal quality, in both the forward and reverse path, can result in more efficient service having fewer disruptions and less down time because the provider may be able to more promptly locate and correct problems, ensure that minimum performance standards are being met, and gather historical data for predicting future performance of the system.

Most conventional coaxial forward and reverse paths utilize analog signals transmitted over coaxial cables. Typical monitoring of these paths offers no integral indicator of signal quality. The only indicator of signal quality at the receiver end of the path is whether the analog signal is received or not. Sophisticated external testing equipment and methods, such as spectrum analysis, are generally utilized to monitor and measure typical analog phenomenon, such as carrier to noise ratio and distortion.

Recently, devices for digitizing portions the reverse path have been made. For example, it is known to digitize the signal transmitted over the fiber optic link portion of the HFC path between the headend and a node. In the reverse path, a node receives analog signals from a subscriber, converts the analog signal to a digital signal, and transmits the digital signal over fiber optic cable to the headend, which converts the digital signal back to analog for transmission to the service provider.

A number of benefits result from digitizing the analog signal and transmitting the digital signal over a fiber optic cable, also referred to as an optical link. For example, unlike analog signals, digital signals can travel long distances (e.g., 60 km) as easily as shorter distances (e.g., 20 km) without any increase in signal deterioration, signal distortion, and signal-to-noise problems. Furthermore, digital signals can be recovered more easily at lower powers than their analog counterparts and can be implemented using readily available parts.

However, performance monitoring of an optical link in a digital HFC path requires expensive external test equipment which is not cost effective to utilize. Generally, therefore, an unsatisfied need exists in the industry for a low-cost method for monitoring digital performance of an optical link in a hybrid fiber coax path without the use of external monitoring equipment.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
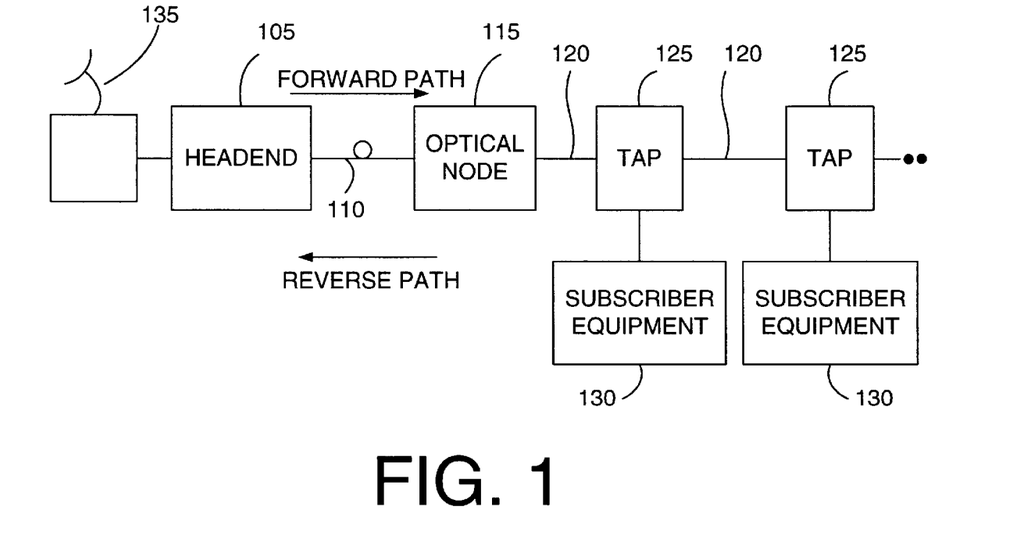
FIG. 1 is a block diagram of a cable television system in accordance with the present invention.

FIG. 1 shows a communications system 100, such as a cable television system, having both forward and reverse paths, i.e., having the ability to communicate downstream in the forward direction and upstream in the reverse direction. The cable television system 100 includes a headend 105 for receiving signals from a satellite 135 that are converted to an intermediate frequency (IF). The converted signal is then modulated into standardized cable television signals that are routed throughout the system 100 to subscriber equipment 130, such as set top decoders, televisions, or computers, located in the residences or offices of system subscribers.

The headend 105 can, for instance, convert the cable television signals to an optical signal that is transmitted over a fiber optic link (hereinafter optical link) 110, in which case a remotely located optical node 115 converts the optical signal to an electrical radio frequency (RF) signal for further transmission through the system 100 over coaxial cable 120. Taps 125 located along the coaxial cable 120 at various points in the distribution system split off portions of the RF signal for routing to subscriber equipment 130 coupled to subscriber drops provided at the taps 125.

The system 100, as mentioned, also has reverse transmission capability so that signals, such as data, video, or voice signals, generated by the subscriber equipment 130 can be provided back to the headend 105 for processing. The reverse signals travel through the taps 125 and any nodes 115 and other cable television equipment, e.g., reverse amplifiers, to the headend 105. In the configuration shown in FIG. 1, RF signals generated by the subscriber equipment 130 travel to the node 115, which converts the RF signals to optical signals for transmission over the optical link 110 to the headend 105.

Figure 2:
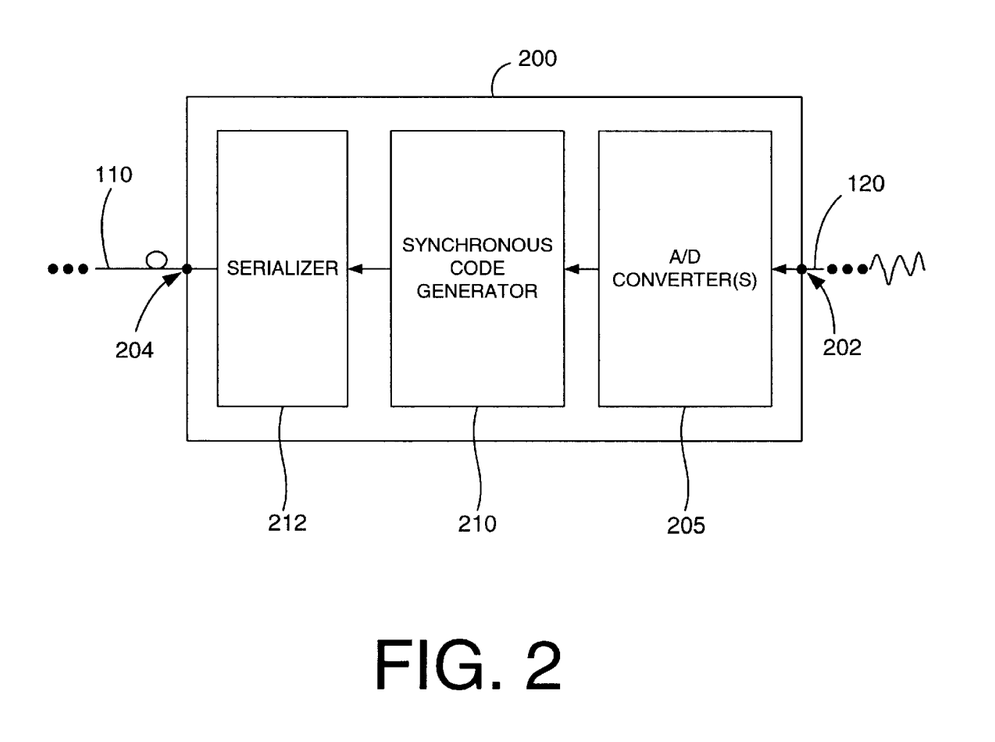
FIG. 2 is a block diagram of an optical transmitter included in the cable television system of FIG. 1 in accordance with an embodiment of the present invention.

Referring to FIG. 2, a digital reverse optical transmitter 200 is provided for transmitting a digital optical signal to the headend 105 in the reverse direction, and for inserting data, including a synchronous code, into the digital signal. The transmitter 200 can, for instance, be included within the optical node 115 or may be located at other suitable locations within the cable television system 100. The transmitter 200 receives, at an input 202, an analog information signal that is representative of one or more reverse RF signals from the subscriber equipment 130. At its output 204, the transmitter 200 provides a digital optical signal that is generated in accordance with the analog information signal, and which includes data, including a synchronous code, inserted by a synchronous code generator 210.

The synchronous code is a unique combination of bits inserted into the digital signal at the transmitter side of the optical link 110. After the digital signal is transmitted over the optical link 110, or a portion of the optical link 110, the synchronous code can be inspected by one or more digital signal processing devices that could be, for instance, located at the head end 105. The processing devices register the number of synchronous code errors and utilize well known sampling calculations to estimate the number of errors occurring in the digital signal, as will be discussed in detail below. In this manner, the performance of the optical link can be determined, obviating the requirement of external testing equipment to determine performance of the optical link 110.

The digital reverse transmitter 200 includes one or more analog-to-digital (A/D) converters 205 for converting the analog information signal to a digital signal, i.e., one or more digital words comprising a particular number of bits. Analog to digital conversion is well known in the art, and may be accomplished in any conventional manner. The resolution of the A/D converters 205, of course, is dependent upon transmitter design parameters. In a preferred embodiment, the sampling rate of the A/D converter is greater than twice the highest frequency of the analog signal. This allows the digital signal to accurately reproduce the analog signal. For instance, in a return path, where the analog signal may have a frequency of 5–40 MHz, the sampling rate of an A/D converter should be at least 80 MHz, and more preferably, around 100 MHz.

The synchronous code generator 210 of the digital reverse transmitter 200 receives a digital signal from the A/D converter(s) 205 and inserts the synchronous code into the digital signal. This synchronous code, as noted above, is utilized as a reference for error detection in the digital signal, which may occur at the headend 105, or at a point along the optical link 110. In addition to inserting a synchronous code into the digital signal, the synchronous code generator 210 scrambles the digital signal to produce a transition rate, which allows for signal synchronization at the receiving end of the optical link 110. The synchronous code generator 210 can also portion the digital signal into multiple-bit frames. Multiple bit frames provide data insertion into the digital signal at specific data intervals, and this inserted data can include information such as synchronous code bits and bits used by devices at the receiving end of the link 110 for descrambling or deframing. The intervals at which data is inserted enable the use of sampling calculations to determine the performance of the optical link 110, as is discussed with reference to FIG. 5 below. The synchronous code generator 210 may be an ASIC, a PLD, or a VLSI, or any other suitable device known in the art for performing the functions of the synchronous code generator 210.

The digital reverse transmitter can also include a serializer 212 that receives data output in parallel from the synchronous code generator 210 and converts the parallel data into serial data streams for communication over the optical link 110 in a manner well known in the art. The serializer 212 may be a specific vendor part or may be a data processing device such as an ASIC (application specific integrated chip), a VLSI (very large scale integration) device, a microprocessor, or a PLD (programmable logic device). As will be appreciated by those of ordinary skill in the art, the synchronous code generator 210 and serializer 212 may be combined into one data processing device.

Figure 3:
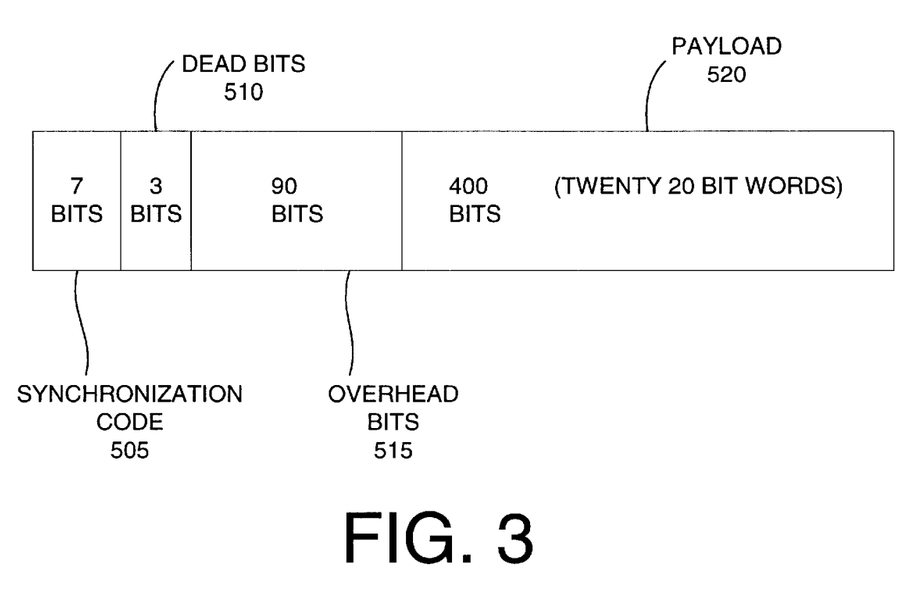
FIG. 3 is a diagram of a digital frame in accordance with an embodiment of the present invention.

FIG. 3 shows a multiple-bit frame produced by the synchronous code generator 210 of the digital reverse transmitter 200 according to one aspect of the invention. Within each multiple-bit frame are fragments, each serving a specific function. One fragment may be designated for the synchronization code 505, which is inserted by the synchronization code generator 210. An example of such a synchronization code 505 is a comma+ character made up of 7 bits, which is disclosed in Franaszek et al., U.S. Pat. No. 4,486,739, the disclosure of which is incorporated herein by reference. Because the synchronous code 505 is used as a reference, it may consist of any bits, words, characters or signals not occurring in the remainder of the digital signal. Other fragments within the frame may include dead bits 510, which separate the synchronization code from other fragments, overhead bits 515, which are used by one or more devices at the receiving end of the optical link 110 to process the digital signal (e.g., for descrambling or deframing the digital signal), and payload bits 520, which can comprise a plurality of multiple-bit words that comprise the primary data delivered over the optical link 110.

The function of the digital reverse transmitter 200 will be more fully appreciated in accordance with one illustrative embodiment of the invention. For example, two A/D converters 205 can receive analog signals from subscriber equipment 130, convert the analog signals into 10 bit parallel data, and output the data to the synchronous code generator 210. The synchronous code generator 210 can combine the 10 bit data to produce 20 bit parallel data, or 20 bit words. The synchronous code generator 210 can then produce frames by combining a plurality of these 20 bit words. One such frame 490, containing 500 bits, is shown in FIG. 3. Over the transmission space of twenty five 20-bit words, among which are the primary payload 520 transmitted over the optical link 110, a plurality of data fragments 505, 510, and 515 are inserted. In this embodiment, synchronization code 505 is one data fragment of the frame and is made up of 7 bits. Additionally, there are 3 dead bits 510 and 90 overhead bits 515. The 20-bit words are output to the serializer 212, which serializes the parallel data for transmission over the optical link 110.

Figure 4:
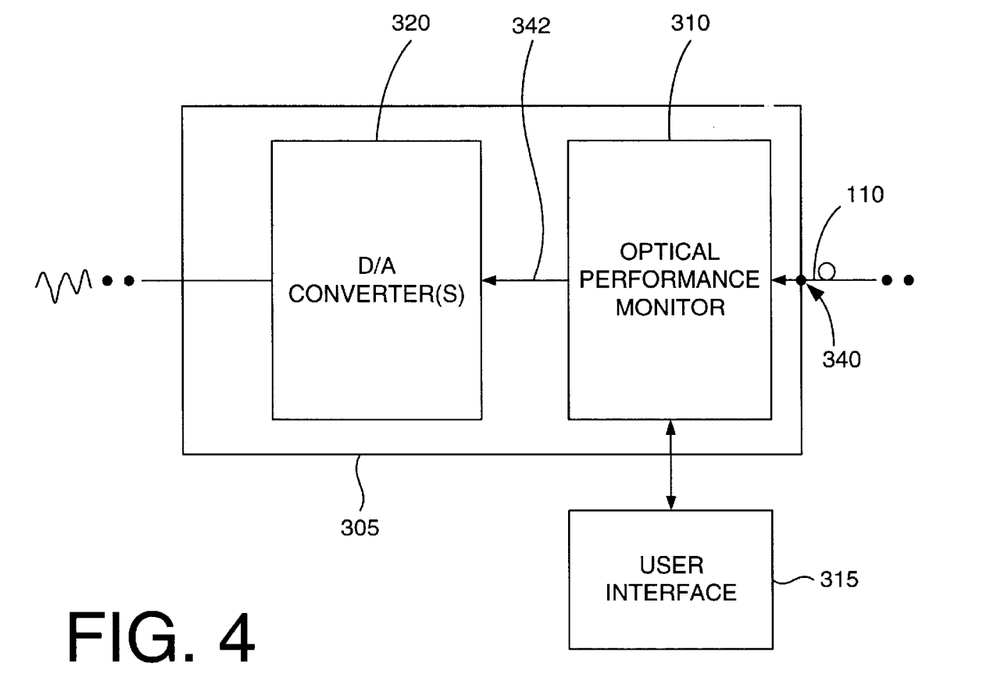
FIG. 4 is a block diagram of an optical receiver included in the cable television system of FIG. 1 in accordance with an embodiment of the present invention.

FIG. 4 is a block diagram of an optical receiver 305 for receiving the digital optical signal transmitted by the optical transmitter 200 over the optical link 110. The receiver 305 includes an optical performance monitor 310 for monitoring optical performance of the digital signal transmitted over the optical link 110 and a user interface 315 for communicating the optical performance of the optical link 110 to a user. The optical receiver 305 can be, for instance, located in the headend 105, although other locations, such as any intervening nodes, may also include the receiver 305. The receiver 305 comprises one or more a digital-to-analog (D/A) converters 320 for converting the digital signal provided at its input 340 to an analog signal in a known manner.

The optical performance monitor 310 monitors optical performance of the optical link 310. Although the embodiment of FIG. 4 shows the optical performance monitor 310 to be located within the receiver 305, the optical performance monitor 310 may also be located outside of the receiver 305. The optical performance monitor 310 receives the digital signal from the optical link 110 as an input and produces an optical performance output to the user interface 315 and an output 342 to the D/A converter(s) 320. The function and operation of the optical performance monitor 310 is discussed with reference to FIG. 5 below.

The user interface 315, in communication with the optical performance monitor 310, enables the user to receive information from the performance monitor 310. The user interface 315 may be located within the optical performance monitor 310, within another area of the optical receiver 305, within the headend 105, or at another remote location where the user may readily receive communications regarding the optical performance of the optical link 110. The user interface 315 communicates the optical performance of the link 110 to the user by audible, visual, or other sensory means, and may utilize computer software and/or hardware to do so.

Figure 5:
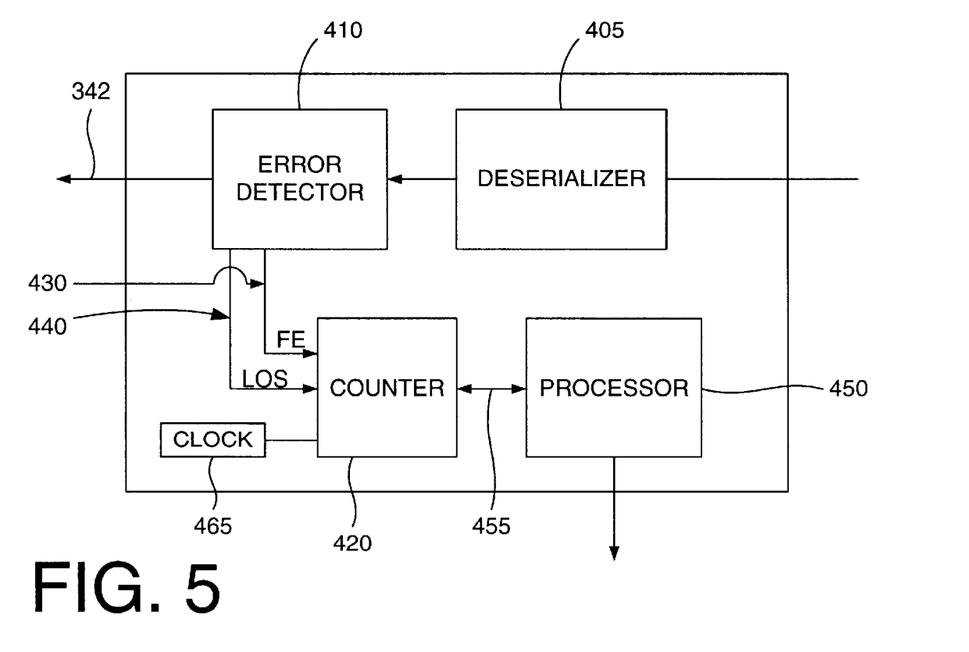
FIG. 5 is a block diagram of the optical performance monitor of FIG. 4 in accordance with an embodiment of the present invention.

FIG. 5 is a block diagram of the optical performance monitor 310. In the embodiment depicted in FIG. 5, the optical performance monitor includes a deserializer 405 that receives the digital signal from transmitter output 204 (FIG. 2) and divides the digital signal into two or more parallel frames to perform a function substantially opposite to that performed by the serializer 212 of the transmitter 200. Like the serializer 212, the deserializer 405 may be a specific vendor part or another data processing device such as an ASIC, a VLSI device, a microprocessor, or a PLD.

According to one illustrative embodiment of the invention, the digital signal transmitted over the optical link 110 can comprise serial PECL (positive emitter common logic) transmitted at 2.5 GBps (Giga bits per second). In this embodiment, the deserializer 405 may divide the digital signal into parallel outputs comprising frames that are 20 bits wide at 125 MHz. The synchronization code, dead bits, and overhead bits are included, for example, over a 500 bit transmission space of twenty five such 20 bit words. The deserializer data output is received by an error detector 410.

Like the deserializer 405, the error detector 410 may be implemented using any number of data processing devices. The error detector 410 deframes and descrambles the digital signal and detects the synchronous code inserted into the digital signal by the synchronous code generator 210. The deframing and descrambling of the digital signal enable the error detector 410 to accurately reproduce, as output 342, the signal received by the synchronous code generator 210 at the transmission side of the optical link 110 prior to framing and scrambling.

Because the synchronous code is unique from other data within the digital signal, the code may be used by the optical performance monitor 310 and the error detector 410 as a sampling reference that indicates errors in the digital signal. This code is used because individual errors in the digital signal may not be detected. Using well known digital signal processing methods, the error detector 410 detects and examines the synchronization code to determine whether the digital signal has been transmitted properly over the optical link 110. Such occurrences are easily detected by the error detector 410 because the synchronization code can be inserted at specific intervals into multiple bit frames of a known number of bits. The error detector uses the data rate of the input, divided by a known frame size, to determine how many times the synchronization code should occur per second. If errors in the synchronous code are detected, the errors are accumulated so that the optical performance of the optical link 110 may be determined using well known sampling and probability equations.

It will be appreciated by those of ordinary skill in the art that the synchronization code need not be located within every multiple-bit frame created by the synchronous code generator 210. Instead, the code could be inserted into every other frame, every third frame, every fourth frame, etc., or any regular frequency. For example, where the synchronous code is inserted into every 500 bit frame, and the data rate is 2.5 GBps, the error detector should detect 5 million occurrences of the synchronization code per second (2.5 GBps/500 bits). Similarly, if the synchronous code were to be inserted into every second 500 bitframe, or every 1000 bits, the error detector should detect 2.5 million occurrences of the synchronization code per second. This second example, however, would produce a less accurate indication of the optical performance of the optical link than the first example because the sampling rate of the synchronous code is one-half the sampling rate of the first example.

Whenever the synchronization code is improperly received at the optical performance monitor 310, the error detector 410 produces either a frame error (FE) output 430 or a loss of signal (LOS) output 440. An FE signal will result if the synchronization code arrives early, arrives late, is delivered improperly, or is not delivered at all. An LOS signal will result if certain programmable conditions in the error detector 410 are met. These may be any conditions the programmer wishes to define, such as consecutive frame errors or a particular number of frame errors over a specified time. For example, if there are three consecutive improper deliveries of the synchronization code, an LOS signal might be provided by the error detector 410.

The FE and LOS outputs from the error detector 410 are received as inputs at the counter 420, which counts errors in the synchronization code and registers LOS outputs. Clock 465 enables the counter 420 to accumulate the errors in the synchronous code over a period of time. The processor 450, which is in communication with the counter 420, monitors the counter 420 and manipulates the accumulated errors using predetermined algorithms, such as probability and sampling equations. Because the signal rate, i.e., the rate at which the synchronous code is inserted into the digital signal, and the rate at which synchronous code errors are detected are all known, the processor 450 can determine the optical performance of the optical link 110. Based on this calculated optical performance, the processor 450 may also determine a bit error rate of the digital signal and may further estimate a noise-to-power ratio of the digital signal from the bit error rate, as is well known to those of ordinary skill in the art. These measures of optical performance can be output by the processor 450 to the user interface 315.

Although the deserializer 405, error detector 410, counter 420, processor 450, and clock 465 are shown to be independent components of the optical performance monitor 310 in the embodiment of FIG. 5, it will be appreciated by those of ordinary skill in the art that these elements may be combined with any other elements within the optical performance monitor 310. The elements may, for instance, be implemented using a programmable chip, such as a PLD, or another integrated chip that may perform the tasks detailed above, such as a VLSI or an ASIC.

Figure 6:
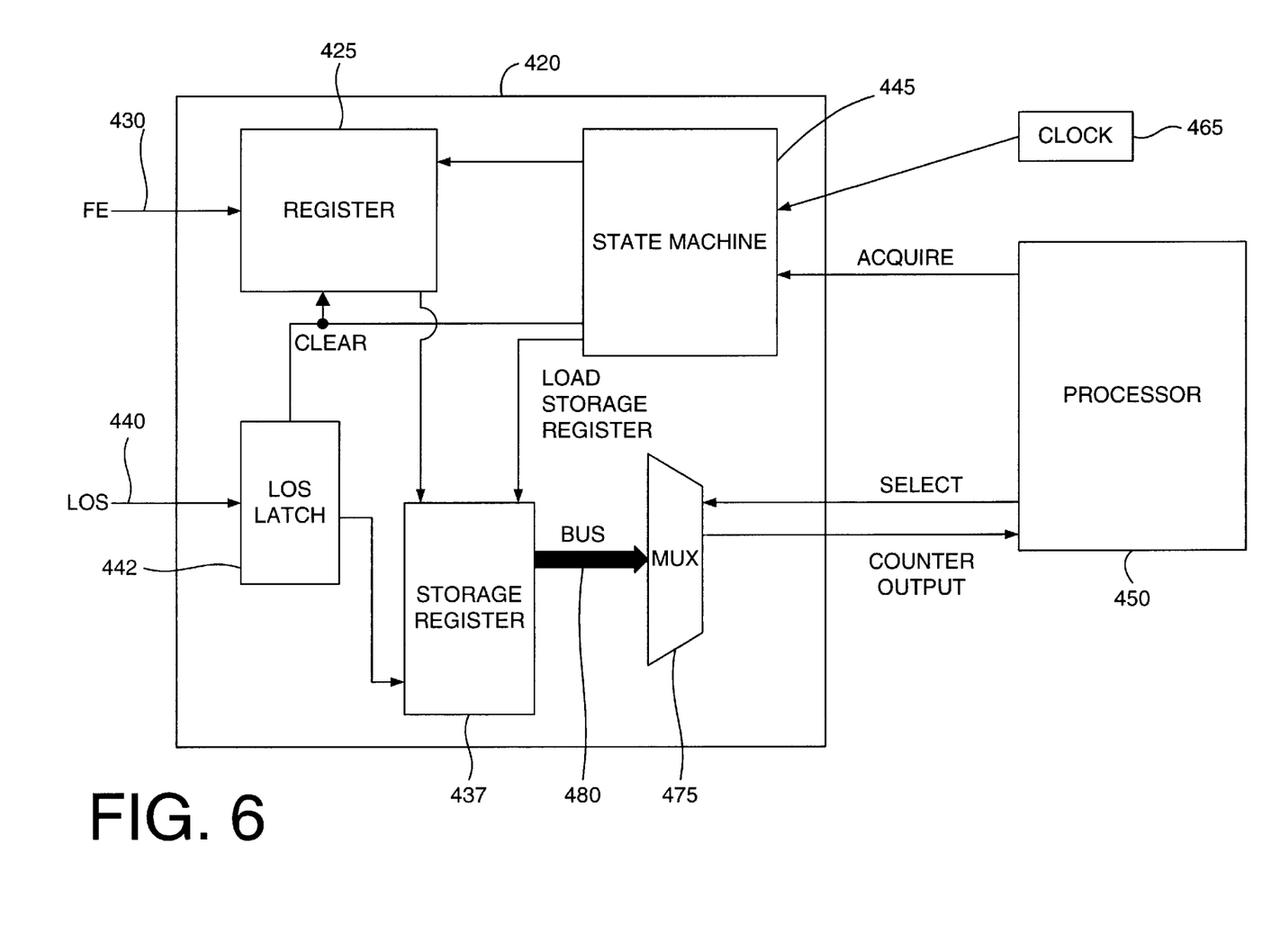
FIG. 6 is a schematic diagram of an embodiment of the counter, processor and clock of the optical performance monitor of FIG. 5.

FIG. 6 shows an electrical diagram of an illustrative embodiment of the counter 420, the clock 465, and the processor 502 of the optical performance monitor 310 of FIG. 5. The counter 420 receives, as an input, the FE output 430 and the LOS output 440 from the error detector 410. The counter 420 counts the FE signals produced by the error detector 410 and tracks LOS outputs of the error detector 410.

The counter 420 may comprise any number of components sufficient to count the FE signals, to track the LOS outputs, and to output these results to the processor 502. Such components may include state machines, registers, clocks, multiplexers, PLDs, serial peripheral interfaces (SPIs), or ASICs. Alternatively, the counter may be implemented solely through use of an ASIC, a PLD, or a VLSI device. According to the embodiment of FIG. 6, the counter 420 includes a register 425, a storage register 437, a LOS latch 442, a state machine 445, and a multiplexer 475.

Register 425 receives and accumulates the FE outputs 430 (one for each synchronous code error) from the error detector 410 by incrementing every time a frame error is detected. The register 425 should be of sufficient size to store an adequate number of FE inputs needed for determining optical performance within acceptable error resolution based upon sampling algorithms. The register 425 stores the number of FE signals for a very short time, such as 10–500 ms, after which the value of the register 425 is stored in the storage register 437.

According to a preferred embodiment of the present invention, the register 425 is a 15 bit register. However, it will be appreciated by those skilled in the art that other registers or storage devices may be used. The current value of the register 425 is output to the storage register 437 when the register 425 detects an "acquire" signal, which is sent to the register 425 by the state machine 445. This acquire signal is triggered by expiration of a set time, such as 250 milliseconds, or, alternatively, can be triggered every time a sequence of operations based on a regular cycle are initiated. Such a sequence of operations may include operations that sense alarms, read incoming serial communications, read A/Ds, set D/As, service the user interface, etc., or perform other timer-based operations of the system. The state machine 445 receives the acquire signal from the processor 450 and, in response, notifies the register 425 to store its value in the storage register 437.

Because the storage register 437 stores data output by the register 425, the storage register 437 should be of sufficient size to store the outputs from register 425. In the present embodiment, the register 437 is a 16 bit register, but other registers or storage devices having different resolutions could alternatively be used. In addition to accumulating the errors from the register 425, the storage register 437 also receives input from the LOS latch 442.

The LOS latch 442 receives, as an input, the LOS output 440 from error detector 410. If a LOS output is received from the error detector 410, the LOS latch 442 registers an LOS (loss of signal) by toggling, and it retains this state regardless of additional LOS outputs 440 or FE outputs 430. Because an LOS has occurred, other errors, such as frame errors, are inconsequential. The LOS latch 442 stays in this state until the next received acquire signal resets the LOS latch 442 and the register 425, as described below with reference to FIG. 7.

The processor 450 drives a MUX (multiplexer) 475 via a "select" signal triggered by a user or based upon a clock to output the contents of the storage register 437 into the processor 450. Communication occurs via a bus 480 and the MUX 475. The processor 450 accumulates this error data for further processing as a historical log of the error performance of the optical link 110. In one embodiment, the processor 450 may store historical data for up to one day before communicating the data to the user through the user interface 315. Also, according to another embodiment of the present invention, an SPI (serial peripheral interface), which is not shown, could be used instead of the MUX 475.

The processor 450 preferably applies algorithms, such as probability and sampling equations, to manipulate the error data received from the storage register 437. Because the processor 450 runs on a real time clock and receives historical data concerning the errors in the optical link 110, the optical quality of the optical link 110 can be determined. Optical quality may, for instance, be indicated by a determination of the bit error rate (BER) of the digital signal. Additionally, a noise-to-power ratio (NPR) measurement may be determined from the BER of the digital signal. The BER or NPR measurement may be displayed on the user interface 315 to the user.

Figure 7:
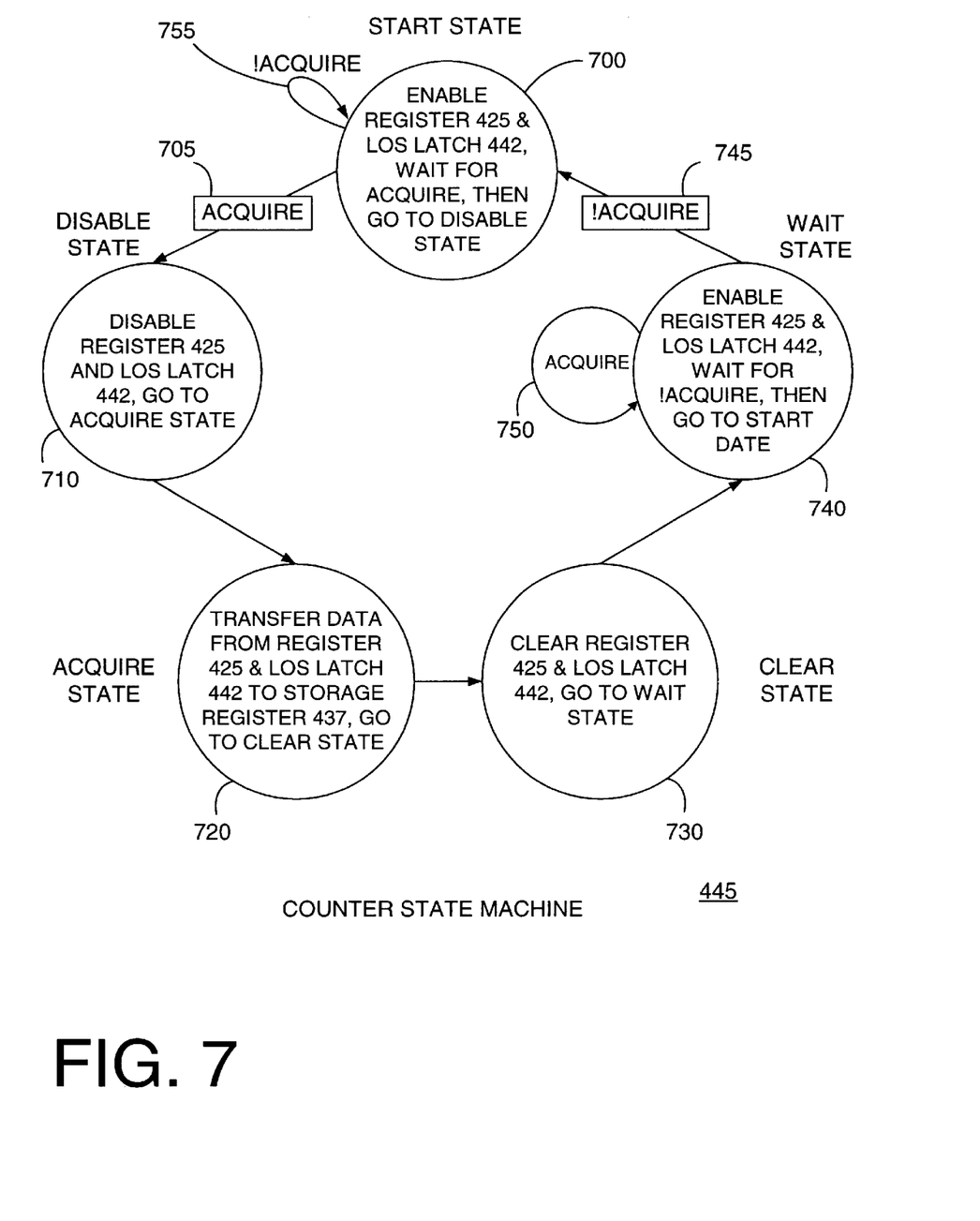
FIG. 7 is a state diagram of the operation of the state machine in accordance with an embodiment of the present invention.

FIG. 7 is an illustrative state diagram of the state machine 445 (FIG. 6), which displays the state of the counter elements at different points in time. After the processor 450 begins to accumulate data through the use of the select signal, the register 425 and LOS latch 442 are reset. Because the register 425 and the LOS latch 442 need to resume receiving data while the last acquire signal is still active (where the "last" acquire signal is that acquire signal sent from the processor to the MUX or SPI to receive data stored in the storage register), state machine logic is required. State machine 445 coordinates the function of the elements within the counter 420 so that register 425 and LOS latch 442 can continue to acquire data while the MUX transmits data to the processor 502.

In the Start State 700, the state machine 445 enables the register 425 and the LOS latch 442. In this state the register 425 and LOS latch 442 may receive error data from the error detector 410. The !Acquire loop 755 of FIG. 7 indicates that the state machine 445 has not been directed to transfer data from the register 425 and the LOS latch 442 to the processor 502, and thus may continue to receive data. After an acquire signal 705 is received by the state machine 445, the state machine 445 goes into a Disable State 710. In this state, the register 425 and the LOS latch 442 are disabled so that they may not receive further data. The state machine 445 then enters an Acquire State 720, in which the data from the register 425 and the LOS latch 442 is sent to the storage register 437. After this is accomplished, the state machine 445 enters a Clear State 730, in which the register 425 and the LOS latch 445 are cleared.

Next, the state machine 445 enters the Wait State 740. In this state, the register 425 and the LOS latch 442 are enabled, as in Start State 700. This allows the register 442 and the LOS latch 442 to once again receive data. The state machine 445 stays in this state until the MUX 475 has finished transmitting data from the storage register 437 to the processor 502. Thus, the register 425 and the LOS latch 442 may continue to receive data, although the storage register 437 may be transmitting data to the processor 502. It is not until the MUX 475, or, alternatively, an SPI (as mentioned above), has completed transmitting data from the storage register 437 to the processor 502 that the state machine 445 returns to the Start State 700.

In summary, the systems and methods for determining optical performance in an optical link of a HFC path as described above provide an indication of the performance of the optical link without many of the problems present in prior art systems. As a result, information can be sent across the optical link in a more reliable and less expensive manner.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for detecting optical link performance of an optical link in a hybrid fiber coax path, comprising:
    converting an analog signal to a digital signal for transmission over an optical link in a hybrid fiber coax path, wherein the digital signal contains a synchronous code;
    transmitting the digital signal including the synchronous code along the optical link to a receiver;
    monitoring for errors in the synchronous code at the receiver, wherein the step of monitoring comprises the steps of:
        detecting errors in the synchronous code, and in response,
        storing a count of the errors in the synchronous code; and
    determining optical performance based upon the errors detected in the synchronous code.

2. The method of claim 1, wherein the step of determining optical performance comprises the step of determining a bit error rate of the digital signal based upon the errors detected in the synchronous code.

3. The method of claim 2, further comprising the step of determining a noise to power ratio measurement from the bit error rate.

4. The method of claim 1, wherein the step of determining optical performance comprises the step of determining a bit error rate of the digital signal based upon errors accumulated in the counter.

5. The method of claim 4, further comprising the step of determining a noise to power ratio measurement from the bit error rate.

6. A system for detecting optical link performance of an optical link in a in a hybrid fiber coax path, comprising:
    a synchronous code generator that generates a synchronous code that is inserted into a digital signal;
    an optical link in communication with the synchronous code generator, wherein the optical link transmits the digital signal, and
    an optical performance monitor that receives the digital signal from the optical link and determines performance of the optical link based on errors in the synchronous code,
    wherein the optical performance monitor comprises:
        an error detector in communication with the optical link, wherein the error detector detects errors in the synchronous code, and in response thereto generates error signals;
        a counter in communication with the error detector, wherein the counter accumulates the error signals received from the error detector for a period of time; and
        a processor in communication with the counter, wherein the processor determines the optical performance of the optical link based upon the number of errors accumulated by the counter.

7. The system of claim 6, wherein the synchronous code comprises a plurality of predetermined characters.

8. The system of claim 6, wherein the counter comprises a first register for accumulating the error signals from the error detector.

9. The system of claim 8, further comprising a second register in communication with the first register, wherein the second register transmits data received from the first register to the processor.

10. The system of claim 6, wherein the counter comprises:
    a first register for accumulating the errors in the synchronous code;
    a second register in communication with the first register, wherein the second register stores data from the first register for transmission to the processor;
    a multiplexer in communication with the second register, wherein the multiplexer transmits the data stored in the second register from the second register to the processor; and
    a serial peripheral interface in communication with the second register, wherein the serial peripheral interface transmits the data stored in the second register from the second register to the processor.

11. The system of claim 6, wherein the processor determines a bit error rate of the digital signal based upon errors accumulated by the counters.

12. A system for detecting optical link performance of an optical link in a hybrid fiber coax path, comprising:
    means for converting an analog signal to a digital signal for transmission over an optical link in a hybrid fiber coax path, wherein the digital signal contains a synchronous code;
    means for transmitting the digital signal including the synchronous code along the optical link to a receiver;
    means for monitoring optical performance of the digital signal in the optical link, wherein the means for moni toring optical performance of the digital signal in the optical link comprises:
- means for detecting errors in the synchronous code, and in response,
- means for counting the detected errors in the synchronous code, wherein the counting means accumulates detected errors, and
- means for determining optical performance based upon errors detected in the synchronous code.

13. The system of claim 12, wherein the means for determining optical performance comprises means for determining a bit error rate of the digital signal based upon errors detected in the synchronous code.

14. The system of claim 13, further comprising means for determining a noise to power ratio measurement from the bit error rate.

15. The system of claim 12, wherein the means for determining optical performance comprises means for determining a bit error rate of the digital signal based upon errors accumulated in the means for counting.

16. The system of claim 15, further comprising means for determining a noise to power ratio measurement from the bit error rate.

* * * * *

UNITED STATES PATENT AND TRADEMARK OFFICE
CERTIFICATE OF CORRECTION

PATENT NO. : 6,498,663 B1
DATED : December 24, 2002
INVENTOR(S) : Farhan et al.

It is certified that error appears in the above-identified patent and that said Letters Patent is hereby corrected as shown below:

Title page,
Item [74], *Attorney, Agent, or Firm*, please correct the names to read as follows: -- Hubert J. Barnhardt III; Kenneth M. Massaroni; Shelley L. Couturier --

Column 6,
Line 36, delete "bitframe," and insert therefore -- bit frame, --

Column 10,
Line 56, delete "counters." and insert therefore -- counter. --

Signed and Sealed this

Twenty-ninth Day of July, 2003

JAMES E. ROGAN
*Director of the United States Patent and Trademark Office*